(12) United States Patent
Moosburger et al.

(10) Patent No.: US 10,939,136 B2
(45) Date of Patent: Mar. 2, 2021

(54) METHOD FOR OPERATING AN AUTOSTERSOSCOPIC DISPLAY DEVICE, AND AUTOSTEREOSCOPIC DISPLAY DEVICE

(71) Applicant: OSRAM OLED GmbH, Regensburg (DE)

(72) Inventors: Juergen Moosburger, Lappersdorf (DE); Hubert Halbritter, Dietfurt (DE); Peter Brick, Regensburg (DE); Mikko Perälä, Tampere (FI)

(73) Assignee: OSRAM OLED GMBH, Regensburg (DE)

( * ) Notice: Subject to any disclaimer, the term of this patent is extended or adjusted under 35 U.S.C. 154(b) by 0 days.

(21) Appl. No.: 16/632,286

(22) PCT Filed: Jul. 24, 2018

(86) PCT No.: PCT/EP2018/070029
§ 371 (c)(1),
(2) Date: Jan. 17, 2020

(87) PCT Pub. No.: WO2019/029985
PCT Pub. Date: Feb. 14, 2019

(65) Prior Publication Data
US 2020/0169755 A1  May 28, 2020

(30) Foreign Application Priority Data

Aug. 7, 2017 (DE) ..................... 10 2017 117 859.7

(51) Int. Cl.
*H04N 13/302* (2018.01)
*H04N 19/597* (2014.01)
*H04N 19/51* (2014.01)

(52) U.S. Cl.
CPC ......... *H04N 19/597* (2014.11); *H04N 13/302* (2018.05); *H04N 19/51* (2014.11)

(58) Field of Classification Search
None
See application file for complete search history.

(56) References Cited

U.S. PATENT DOCUMENTS 5,602,658 A  2/1997  Ezra et al.
9,602,795 B1 *  3/2017  Matias ............... H04N 5/23238
(Continued)

FOREIGN PATENT DOCUMENTS

DE  69425926 T2  3/2001
DE  102009041783 A1  3/2011

OTHER PUBLICATIONS

Wikipedia, "Multiview Video Coding," https://en.wikipedia.org/w/index.php?title=Multiview_Video_Coding&oldid=784407449, Jun. 8, 2017, pp. 1-3.

*Primary Examiner* — Christopher G Findley
(74) *Attorney, Agent, or Firm* — Slater Matsil, LLP

(57) ABSTRACT

A method for operating a display device is disclosed. In an embodiment, a method for displaying images or films via a display device includes emitting, for each radiation direction, a partial image composed of sub-pixels of all pixels belonging to this radiation direction and receiving control data for at least some of the sub-pixels at the display device by a data compression algorithm, wherein the data compression algorithm comprises a delta coding, wherein the delta coding includes an initial value, wherein the initial value includes one of the partial images defined as a main image, wherein at least some of the remaining partial images are received as deviations from the main image, and wherein edges of a three-dimensional object to be displayed are (Continued)

excluded from data compression when merging surfaces enclose a real angle of 135° or less.

13 Claims, 4 Drawing Sheets

(56) References Cited

U.S. PATENT DOCUMENTS

| | | |
|---|---|---|
| 2007/0058034 A1 | 3/2007 | Numazaki et al. |
| 2013/0016898 A1 | 1/2013 | Tchoukaleysky |
| 2014/0015926 A1 | 1/2014 | Lu et al. |
| 2014/0136728 A1 | 5/2014 | Xu et al. |
| 2014/0320614 A1* | 10/2014 | Gaudreau .............. G02B 30/27 348/51 |
| 2014/0341289 A1 | 11/2014 | Schwarz et al. |
| 2015/0063464 A1 | 3/2015 | Chen et al. |
| 2015/0312580 A1 | 10/2015 | Hannuksela |
| 2017/0108630 A1* | 4/2017 | Wang .................... G02B 5/201 |

\* cited by examiner

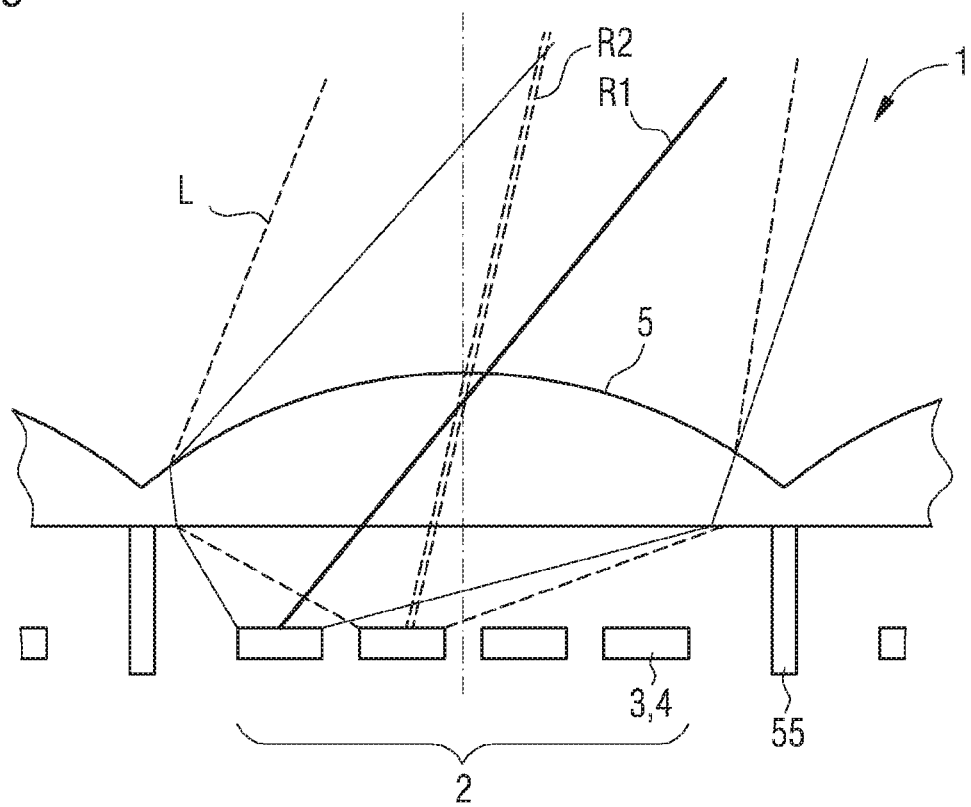

METHOD FOR OPERATING AN AUTOSTERSOSCOPIC DISPLAY DEVICE, AND AUTOSTEREOSCOPIC DISPLAY DEVICE

This patent application is a national phase filing under section 371 of PCT/EP2018/070029, filed Jul. 24, 2018, which claims the priority of German patent application 102017117859.7, filed Aug. 7, 2017, each of which is incorporated herein by reference in its entirety.

TECHNICAL FIELD

A method for displaying images and/or films by operating an autostereoscopic display device and an autostereoscopic display device is provided.

SUMMARY

Embodiments provide a method for operating an autostereoscopic display device having a high resolution at a practical data transmission rate.

According to at least one embodiment, autostereoscopic images and/or films are displayed using the method. That is, images and/or films can be represented three-dimensionally directly to an observer by means of the method, without the aid of spectral filters or polarization filters, that is, without so-called 3D goggles.

According to at least one embodiment, the display device comprises at least 100×70 pixels or 640×480 pixels or 1000×750 pixels or 2000×1200 pixels. The three-dimensional images and/or films can thus be displayed with a high resolution by the display device.

According to at least one embodiment, each of the pixels for the three-dimensional representation of the images and/or the films is configured to operate at least N emission directions. N is a natural number greater than or equal to 12 or greater than or equal to 20 or greater than or equal to 40. The emission directions preferably differ from one another in each case by a fixed angle.

According to at least one embodiment, each of the pixels has at least N sub-pixels. Each of the sub-pixels is configured to operate one of the emission directions and to generate light for the corresponding pixel and the corresponding emission direction.

According to at least one embodiment, a partial image is emitted for each emission direction. The partial image is composed of the sub-pixels of all pixels belonging to the relevant emission direction. In other words, the emission of the sub-pixels for a particular emission direction results in the partial image. For example, if 40 emission directions are present, then 40 partial images are emitted, wherein each partial image is emitted in a specific emission direction.

An observer perceives in particular two of the partial images, in each case a partial image for one eye. The three-dimensional sensory impression is produced by the two simultaneously perceived partial images. For example, the partial images show an object to be displayed in slightly different perspectives, as a result of which the three-dimensional impression is conveyed.

According to at least one embodiment, for at least some of the sub-pixels control data is transmitted to the display device by means of a data compression algorithm such as a delta coding. That is, no complete data set is transmitted for all sub-pixels, but control signals for at least some of the sub-pixels are derived from the control data for other sub-pixels. Delta coding means in particular that the differences of at least some of the sub-pixels with respect to other of the sub-pixels are transmitted in the relevant control data.

In at least one embodiment, using the method images and/or films are displayed using an autostereoscopic display device. The display device has at least 100×70 pixels for the three-dimensional representation of the images and/or films. Each of the pixels operates at least N emission directions and has at least N sub-pixels for this purpose. N is a natural number greater than or equal to 12. For each emission direction, a partial image is emitted which is composed of the sub-pixels of all pixels belonging to said emission direction. Data for at least some of the sub-pixels is transmitted to the display device by means of a data compression algorithm, in particular a delta coding.

A 3D autostereoscopic display such as the display device described herein has N pixels formed from N sub-pixels. This means that the data rate per pixel or image point increases to N times as compared to conventional displays, for example by one hundred times for N=100. Thus, a hundred times larger bandwidth and/or data rate would be required for controlling the display without further measures. This is problematic. Large-area autostereoscopic displays are therefore not yet customary.

In the method described here, a compression algorithm, for example, a spatial and/or temporal delta coding, is used. The common features of the individual partial images are utilized and preferably only the differences from partial image to partial image are transmitted. As a result, a significant reduction in the data rate per pixel can be achieved, since the required information per sub-pixel is similar between different pixels.

In display device, while controlling the pixels, a decoding takes place, so that the pixels with the sub-pixels can be driven again with the required data. In particular, only a difference from partial image to partial image is thus transmitted.

The required data rate for the control of the display device can thus be reduced by the use of an intelligent data compression and the associated decoding. A low system bandwidth and a lower power consumption can thus be realized. In addition, simpler control can be achieved per pixel.

According to at least one embodiment, one partial image or a plurality of partial images is/are used as an output value for the compression algorithm, in particular for the delta coding. The partial images which serve as output values for the data reduction are referred to as main images. For the remaining partial images which are not main images, only the deviations from the relevant main image or from the relevant main images are transmitted to the display device.

According to at least one embodiment, a number of main images which are transmitted as a basis for the delta coding of the remaining partial images is at least 0.1×N or 0.02×N or 0.01×N and/or at most 0.3×N or 0.2×N or 0.1×N. That is, approximately 10 partial images are reconstructed from one main image. A significant reduction in the data rate with simultaneously high image quality can thereby be achieved.

According to at least one embodiment, the change of the partial images based on the main image is coded directly with respect to the main image and thus with respect to the radiation direction belonging to the main image. That is, a plurality of the partial images are each directly referenced to the associated main image.

According to at least one embodiment, the changes of the partial images based on the main image are each coded with respect to the adjacent partial image. That is, the delta coding takes place sequentially over the respective emission directions. For example, the changes of a second partial image with respect to a first partial image and the changes of the first partial image with respect to the associated main image as well as the associated main image are transmitted as control data.

According to at least one embodiment, films are displayed using the method. The films are composed of a sequence of successive scene images. For example, at least 20 or 50 or 100 scene images per second are displayed or at least refreshed. The scene images in turn are composed of the associated partial images so that each three-dimensional scene image is preferably composed of the N partial images for the N emission directions.

According to at least one embodiment, a compression algorithm such as a delta coding is also used for the control data of the sequence of the scene images. At least one of the scene images is used as a basis for temporal delta coding. It is possible that, for example, one or more of the scene images is/are used for referencing for the delta coding per second, so that no too long referencing chains result in the time domain.

According to at least one embodiment, the temporal delta coding of the scene images comprises a data reduction by means of a motion prediction or motion compensation. In particular, a block-by-block motion prediction, also referred to as a block motion compensation or BMC for short, or a global motion prediction, GMC for short, is used.

According to at least one embodiment, an angle between adjacent emission directions, in particular in a horizontal plane, is at least 0.5° or 1°. Alternatively or additionally, this angle is at most 2.5° or 1.5° or 1°.

According to at least one embodiment, the pixels are RGB pixels. Each sub-pixel preferably has a color range for red, green and blue light. Each sub-pixel is preferably also an RGB sub-pixel.

According to at least one embodiment, as light sources the display device comprises one or more semiconductor lasers and/or one or more light-emitting diodes and/or one or more semiconductor laser chips and/or one or more light-emitting diode chips. The semiconductor lasers and/or light-emitting diodes and/or semiconductor laser chips and/or light-emitting diode chips can each be single-channel or multi-channel, in particular can be pixelated. In particular, exclusively semiconductor lasers or exclusively light-emitting diodes serve as a light source for the display device. The semiconductor lasers and/or light-emitting diodes can be identical in construction and can emit light of the same spectral composition and can be combined with differently colored emitting phosphors in order to realize, in particular, RGB pixels. Alternatively, different color-emitting semiconductor lasers and/or light-emitting diodes are present, which are based, for example, on different semiconductor materials such as AlInGaAs, AlInGaP and/or AlInGaN.

According to at least one embodiment, an optical element is provided in the display device for the individual pixels. The optical element is, for example, a lens such as a converging lens or a lens array with a plurality of individual lenses arranged, for example, in the manner of a matrix. Alternatively, the optical element can be a reflective optical unit. Systems comprising a plurality of optical elements are also possible.

According to at least one embodiment, the sub-pixels are each realized by a partial region of the optical element, in particular of the associated lens. For example, the emission directions are realized in that a specific region of the converging lens is illuminated and a radiation is thereby emitted in a specific direction. Preferably, there is a one-to-one association between the pixels and the optical elements such as the lenses. A plurality of the pixels can alternatively be assigned to a common lens and/or a common optical element.

According to at least one embodiment, the sub-pixels are each formed by a placement of a light source relative to an optical axis of the optical element. For example, the light sources are designed as LED chips which completely or almost completely illuminate the optical element, for example, for at least 50% or 80% or 90%, wherein the light sources radiate in different directions depending on the distance from the optical axis.

According to at least one embodiment, the display device extends for a viewer over a spatial angle of at least 0.01 sr or 0.02 sr. Alternatively or additionally, this spatial angle range is at most 1 sr or 0.5 sr.

According to at least one embodiment, a distance between the display device and the observer is at least 0.5 m or 1 m and/or at most 10 m or 5 m or 3.5 m. That is, the viewer can be located comparatively close to the display device, made possible by the high resolution capability and the high number of pixels in the display device.

According to at least one embodiment, the data compression algorithm, in particular the delta coding, excludes edges of a three-dimensional object to be displayed, at which touching surfaces enclose an angle of 135° or less. Surfaces that meet at comparatively small angles are of increased importance for the reproduction of a correct, realistic three-dimensional impression. In order to arrive at a high-quality three-dimensional image in spite of data compression during actuation, corresponding edges are therefore preferably excluded from the data compression.

According to at least one embodiment, the control data is expanded in a decoding unit of the display device to create a complete set of control signals for all sub-pixels. The control data is thus deciphered in the decoding unit. The decoding unit can be a small computer unit.

Further, an autostereoscopic display device is provided. The autostereoscopic display device is configured for a method as described in connection with one or more of the above embodiments. Features of the display device are therefore also disclosed for the method and vice versa.

In at least one embodiment, the autostereoscopic display device comprises at least 100×70 pixels for the three-dimensional representation of images and/or films, wherein each pixel is provided for at least N emission directions and has at least N sub-pixels for this purpose. N is a natural number greater than or equal to 12. A data input is provided for receiving control data for the images and/or films, wherein the control data is present in a coded manner, in particular compressed, for example delta-coded. The display device also has a decoding unit by means of which the compressed and/or coded control data can be expanded to form a complete set of control signals for all sub-pixels.

BRIEF DESCRIPTION OF THE DRAWINGS

An autostereoscopic display device described here and a method described here are explained in more detail with reference to the drawing on the basis of exemplary embodiments. Identical reference signs indicate identical elements in the individual figures. However, no relationships true to scale shown, but rather individual elements can be represented in an exaggerated large manner for better understanding.

In the figures:

FIGS. 1A-1C, 2 and 6 are schematic illustrations of exemplary embodiments of autostereoscopic display devices;

DETAILED DESCRIPTION OF ILLUSTRATIVE EMBODIMENTS

Figure 1:
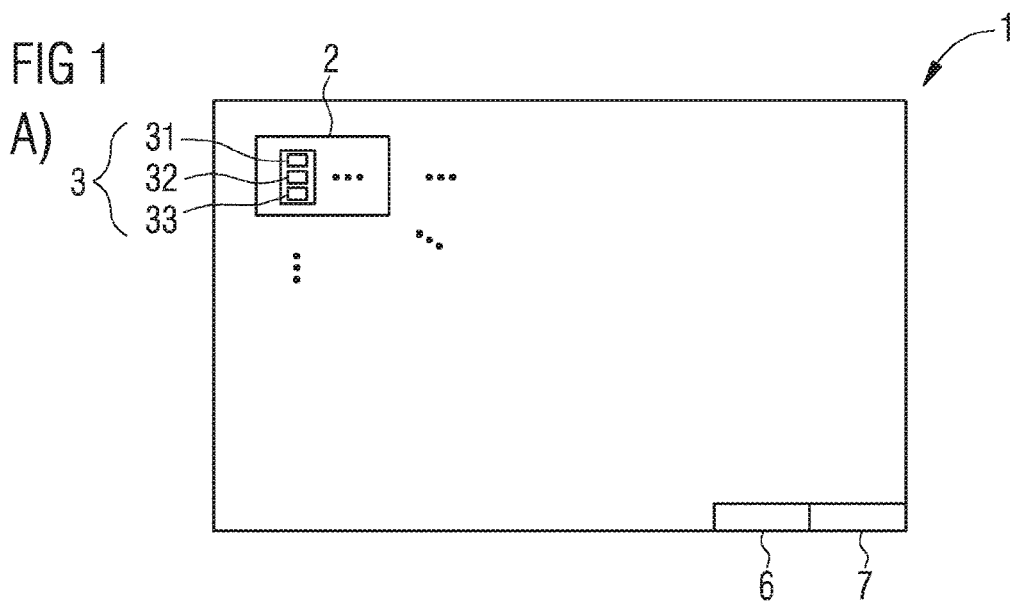
Figure 1:
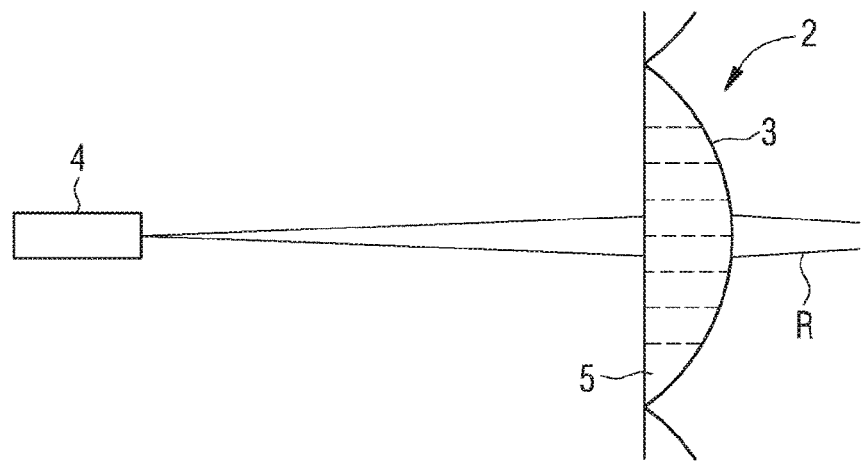
Figure 1:
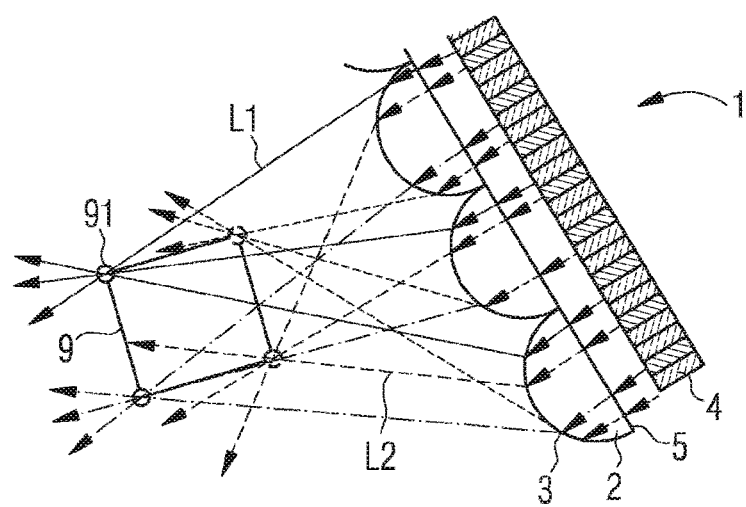

In FIG. 1A, a schematic plan view of an exemplary embodiment of an autostereoscopic display device 1 described herein is illustrated. A plurality of pixels 2 is preferably arranged in the form of a matrix in a display area of the display device 1. The pixels 2 are each composed of a plurality of sub-pixels 3. Each of the sub-pixels 3 preferably has a first color region 31 for red light, a second color region 32 for green light, and a third color region 33 for blue light.

For a representation of films with an image repetition frequency of 100 Hz, a refresh time per color range 31, 32, 33 of 10 ms is required. In the case of a 10 bit resolution, this results per color region 31, 32, 33 a required data rate of 1 kbit/s. If per pixel 2, for example, 40 sub-pixels 3 are present, thus 120 color regions 31, 32, 33 are to be controlled per pixel 2. The required data rate is thus 120 kbit/s.

In the case of a display device for a high-resolution video format, in particular a 4K2K format, there are, for example, 4096×2160 pixels or 3840×2160 pixels. Hence, about 8 million pixels 2 may be present. An efficient data reduction is required due to the high number of color regions 31, 32, 33 per pixel 2, in order to be able to represent films with the required image repetition rates in the range of 100 Hz.

Furthermore, the display device 1 has a data input 7. The data input 7 is, for example, an HDMI connection. It is also possible that the data input 7 need not to be wire-based, but is configured for an optical data transmission or radio data transmission. For decoding compressed data, the display device 1 further comprises a decoding unit 6, for example, a microcomputer.

The optical mode of operation of the pixels 2 is illustrated in more detail in the schematic sectional view in FIG. 1B. A light source 4, such as a semiconductor laser or an array of semiconductor lasers, emits light which impinges on a converging lens 5 subdivided into individual regions for the sub-pixels 3. Due to the locally different curvatures of the lens 5 in the regions for the sub-pixels 3, radiation is emitted in different emission directions R. It is possible that each pixel 2 is formed by an individual convergent lens 5.

Activation and energization of the light sources 4 for the color regions 31, 32, 33 preferably takes place by means of pulse width modulation, PWM for short, or bit angle modulation, BAM for short. That is, the light sources 4 are preferably operated with a constant current which, according to the desired brightness, is applied to the light sources 4 during a specific time slice.

In the schematic sectional view in FIG. 1C, the function is likewise illustrated. In this case, the light source 4 is formed as an array of LEDs. Different regions of the lenses 5 are used for the different emission directions of the sub-pixels 3. Individual light beam bundles 11, 12 are emitted by the sub-pixels 3. For example, at edges 91 of an object 9 to be represented, beam bundles are located from the light beam bundles 11, 12, with which a real image of the object 9 to be represented is generated. As an alternative to a real image, a virtual image can also be created.

A diameter of the lenses 5 is, for example, approximately 1 mm. A distance between the lenses 5 and the particularly real image of the object 9 to be represented is preferably at least ten times or fifty times or hundred times the average diameter of the lenses 5, which can be true in all other exemplary embodiments, too. In FIG. 1C the distance between the real image and the lenses 5 is thus at least 0.1 m. In this respect, the illustration of FIG. 1C is very strongly compressed in the left-right direction.

Figure 3:
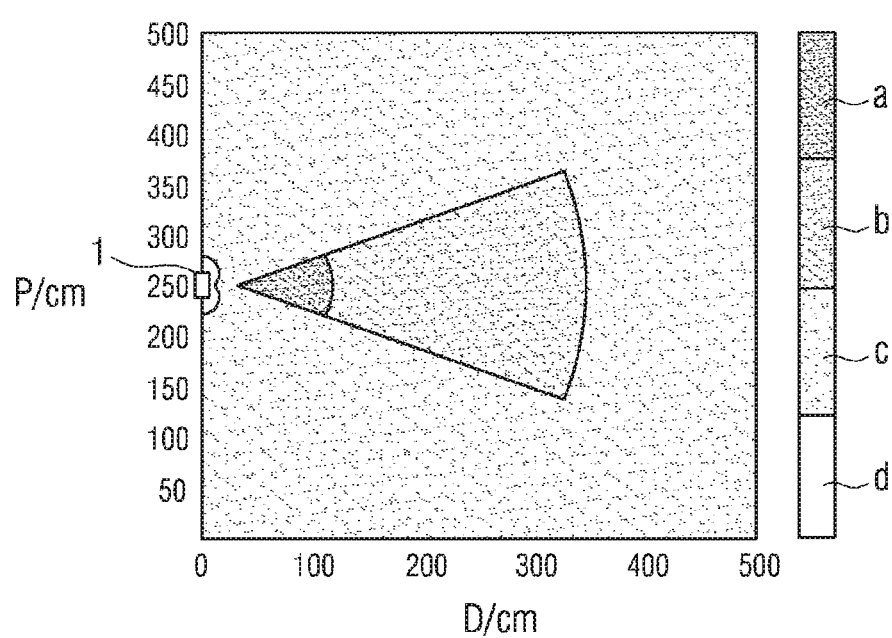
FIG. 3 is a schematic illustration of an imaging portion of an exemplary embodiment of a display apparatus.
Figure 4:
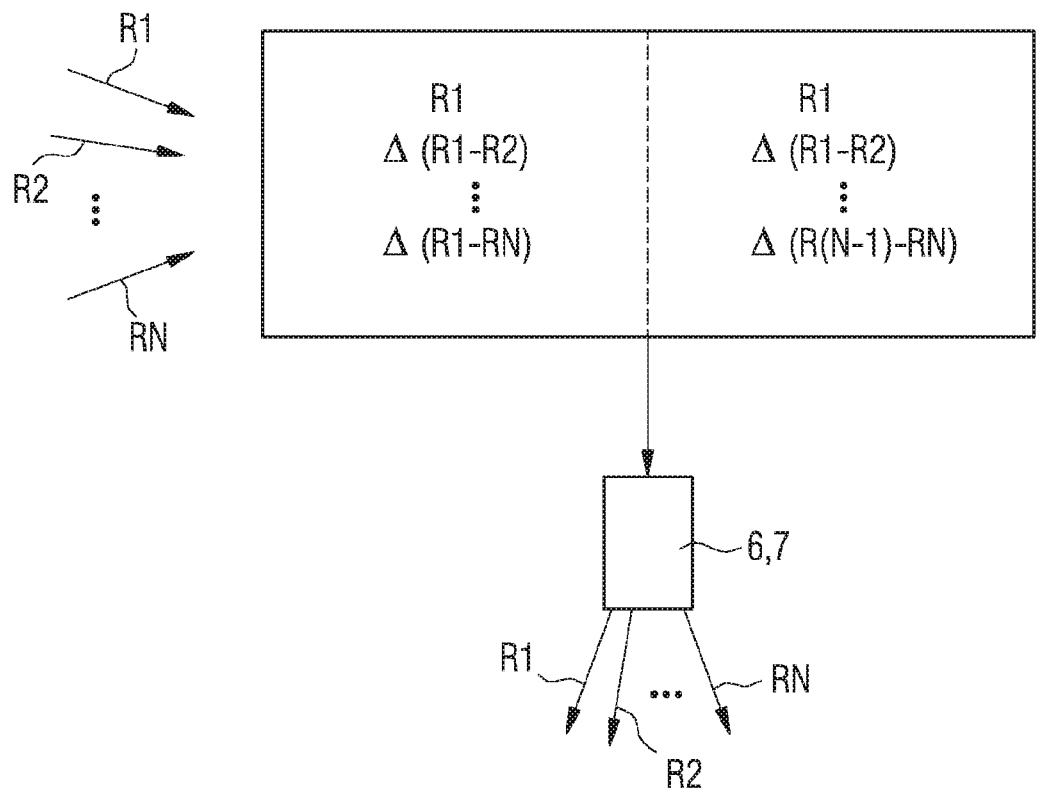
FIGS. 4, 5A and 5B are schematic illustrations of exemplary embodiments of methods described herein for operating display devices described herein.

The display device 1 of FIG. 1C is constructed, for example, as indicated in DE 10 2016 113 669 A1, see in particular FIGS. 3 and 4 and the associated description. This patent application, in particular FIGS. 3 and 4 and the description of these figures, is incorporated herein by reference.

Figure 2:
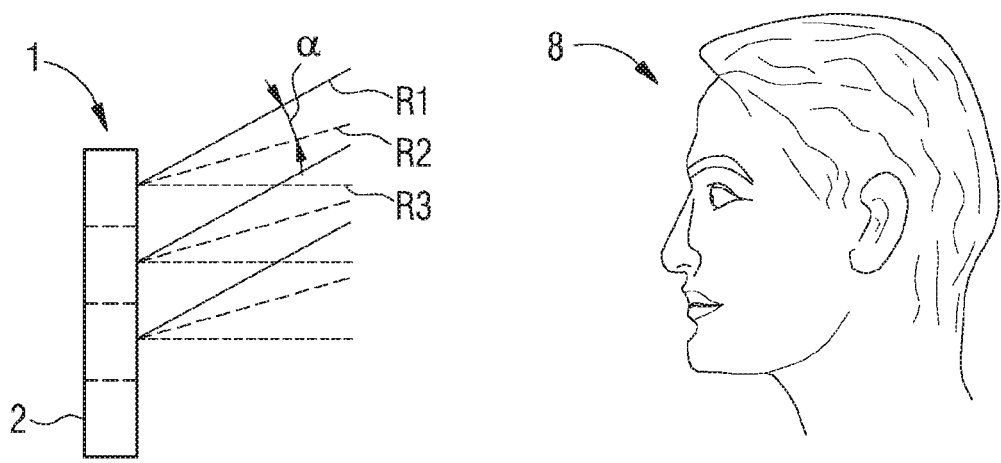

FIG. 2 illustrates a further schematic sectional view of an exemplary embodiment of the display device 1. It is shown that light is emitted from the pixels 2 via the sub-pixels in each case in different emission directions R1, R2, R3. An angle between adjacent emission directions R1, R2, R3 is, for example, approximately 1°. A viewer 8 perceives one of the partial images belonging to the radiation directions R1, R2, R3 per eye, as a result of which the three-dimensional impression is produced. By means of the emission directions R1, R2, R3, in particular a fanning out in a horizontal plane takes place.

It is possible for the display device 1 to additionally provide sensors (not shown), for example, for an ambient brightness, a temperature of the color regions 31, 32, 33 and/or a color location and brightness of the color regions 31, 32, 33. An operating duration counter can also be present. As a result, it is possible to ensure image generation with a constant high color reproduction quality over the entire operating period of the display device 1.

Sensors can also be provided with which a position of the observer can be determined. Hence, required emission directions R as well as the associated partial images can be represented with a higher resolution and/or a higher image repetition rate than other partial images. This makes it possible to reduce the computing effort in the control of the pixels 2.

In the schematic plan view in FIG. 3, it is illustrated that a 3D impression is obtained in front of the display device 1 in a sector-shaped area, as seen in plan view, compare the regions a and b. In a region c there is merely a two-dimensional impression. In a region d very close to the display device 1, a mixture is present between the 2D impression and the 3D impression. The top view of FIG. 3 relates to a distance D in the direction perpendicular to the display device 1 and to a lateral position P in the direction parallel to the display device 1.

For example, 40 different directions of emission R are present in accordance with FIG. 3. An angle difference between the emission directions is 1°. That is, a difference from emission direction to emission direction and from the associated partial image to partial image is relatively low for an observer. It is thereby possible to transmit only the differences between partial images, corresponding to different emission directions, in order to control the display device 1. This results in a significant reduction in the data rate.

This is additionally illustrated in FIG. 4. The complete partial images for the different emission directions R1, R2 to RN are used as input data. In a coding unit, for example, a delta coding is carried out. One of the partial images serves as a main image for one of the radiation directions R1;

alternatively, a plurality of emission directions and the associated partial images thereof can be used as main images.

The delta coding takes place, for example, in each case directly onto the partial image of a particular radiation direction R1, see the left half of the coding device shown schematically in FIG. 4. As an alternative, sequential coding can take place successively over the emission directions, see in FIG. 4 the right half of the coding device.

The control signals compressed in this way are transmitted to the display device, are received there in the data input 7 and are expanded and decompressed again in the decoding unit 6 into a complete set of control signals for the emission directions R1, R2, RN.

Figure 5:
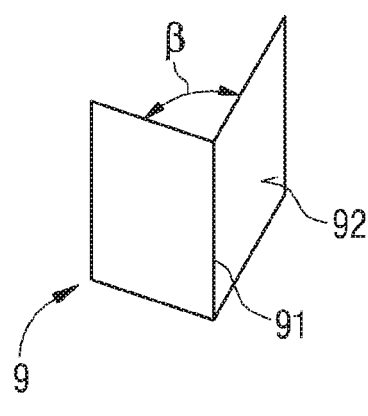
Figure 5:
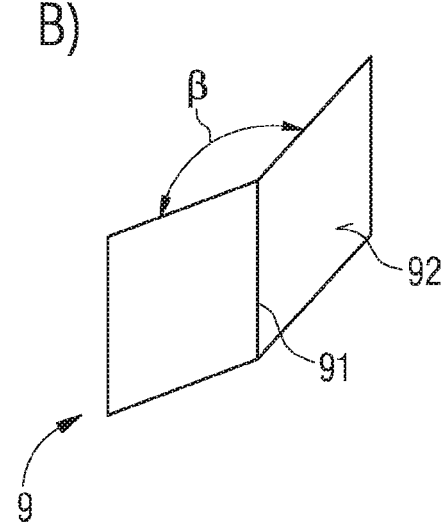

In the perspective views of FIGS. 5A and 5B, it is illustrated that object edges 91 at which object surfaces 92 collide at a relatively small angle, can be excluded from data compression and delta coding in order to achieve improved 3D reproduction quality. That is, the object edge 91 of FIG. 5A is, for example, excluded from the delta coding, whereas the object edge 91 between the object surfaces 92, which include a comparatively large angle with respect to one another, can be delta-coded.

In the exemplary embodiment of FIG. 6, a plurality of the light sources 4 is assigned to each of the lenses 5, wherein the light sources 4 almost completely illuminate the associated lens 5. The different radiation directions R1, R2 result from the fact that the light sources 4 are arranged at different distances from an optical axis 50 of the associated lens 5. In order to prevent optical crosstalk, preferably optical insulations 55 are present between adjacent lenses 5, for example of an absorbing, opaque material. The light sources 4 in this case are, for example, light-emitting diode chips which can have a Lambertian emission characteristic.

The pixels 2 can each be formed of a lens 5 with the associated light sources 4, so that the light sources 4 represent the sub-pixels 3. As an alternative, a plurality of lenses 5 together with associated light sources 4 is present in order to form together one of the pixels 2. Further alternatively, one lens 5 is associated with a plurality of the pixels 2. The same can also apply in all other exemplary embodiments.

As well as in all other exemplary embodiments, separate semiconductor lasers and/or light-emitting diodes and/or semiconductor laser chips and/or light-emitting diode chips, which can be single-channel or pixelated, can be used in each case for the light sources 4.

The invention described here is not limited by the description with reference to the exemplary embodiments. On the contrary, the invention comprises each new feature and any combination of features, in particular any combination of features in the claims, even if this feature or this combination itself is not explicitly stated in the claims or exemplary embodiments.

The invention claimed is:

1. A method for displaying images or films via an autostereoscopic display device, wherein the display device has at least 100×70 pixels for a three-dimensional representation of the images or films, wherein each pixel operates at least N emission directions and each pixel comprises at least N sub-pixels, and wherein N is a positive integer greater than or equal to 12, the method comprising:
   emitting, for each radiation direction, a partial image composed of sub-pixels of all pixels belonging to this radiation direction; and
   receiving control data for at least some of the sub-pixels at the display device by a data compression algorithm,
   wherein the data compression algorithm comprises a delta coding,
   wherein the delta coding includes an initial value,
   wherein the initial value includes one of the partial images defined as a main image,
   wherein at least some of the remaining partial images are received as deviations from the main image, and
   wherein edges of a three-dimensional object to be displayed are excluded from data compression when merging surfaces enclose a real angle of 135° or less.

2. The method according to claim 1, wherein a number of main images is between 0.02 N and 0.2 N inclusive.

3. The method according to claim 1, wherein changes of the partial images based on the main image are each directly coded with respect to the main image and thus are each directly coded with respect to the radiation direction belonging to the main image.

4. The method according to claim 1, wherein changes of the partial images based on the main image are each coded with respect to the adjacent partial image so that the delta coding takes place sequentially over the respective emission directions.

5. The method according to claim 1, wherein the films are composed of a sequence of successive scene images and each scene image is composed of the associated partial images, and wherein the delta coding is carried out on basis of at least one of the scene images.

6. The method according to claim 5, wherein the data compression algorithm of the scene images comprises a data reduction by a motion prediction.

7. The method according to claim 1, wherein an angle between adjacent radiation directions lies between 0.5° and 2.5° inclusive in a horizontal plane, and wherein the pixels are RGB pixels such that each sub-pixel is divided into a respective color region for red, green and blue light.

8. The method according to claim 1, wherein the display device comprises a plurality of semiconductor lasers or light-emitting diodes as a light source.

9. The method according to claim 1, wherein the display device comprises at least one lens for each individual pixel, and wherein the sub-pixels are realized by partial regions of the associated lens.

10. The method according to claim 9, wherein the display device comprises a plurality of lenses for the pixels, wherein the lenses are illuminated by associated light sources by at least 50% or completely, and wherein the light sources are arranged at different distances from an optical axis of the associated lens so that different emission directions result.

11. The method according to claim 1, wherein the display device extends over a spatial angle for an observer of at least 0.02 sr, wherein a distance between the display device and the observer is between 0.5 m and 3.5 m inclusive.

12. The method according to claim 1, wherein the control data are decoded in a decoder of the display device to a complete set of control signals for all sub-pixels.

13. An autostereoscopic display device comprising:
   at least 100×70 pixels for a three-dimensional representation of images or films, each pixel configured for emission in N directions, wherein each pixel has at least N sub-pixels, N being a positive integer greater than or equal to 12;
   a data input configured to receive control data for the images or films in a compressed manner; and
   a decoder, wherein the display device is configured to operate the method according to claim 1.

\* \* \* \* \*